United States Patent
Elliot et al.

(10) Patent No.: US 7,892,333 B2
(45) Date of Patent: Feb. 22, 2011

(54) AIR TREATMENT DEVICE USED IN A PARTICLE FILTER OR A COMBINED FILTER FOR A HEATING, VENTILATION AND/OR AIR CONDITIONING INSTALLATION FOR A VEHICLE CABIN

(75) Inventors: Gilles Elliot, Courcouronnes (FR); Frédéric Ladrech, Maurepas (FR); Frédéric Giraud, Le Perray en Yvelines (FR)

(73) Assignee: Valeo Systemes Thermiques S.A.S., Le Mesnil Saint Denis (FR)

( * ) Notice: Subject to any disclaimer, the term of this patent is extended or adjusted under 35 U.S.C. 154(b) by 613 days.

(21) Appl. No.: 11/629,741

(22) PCT Filed: Jun. 13, 2005

(86) PCT No.: PCT/IB2005/002152

§ 371 (c)(1),
(2), (4) Date: May 15, 2007

(87) PCT Pub. No.: WO2006/003515

PCT Pub. Date: Jan. 12, 2006

(65) Prior Publication Data

US 2007/0261376 A1  Nov. 15, 2007

(30) Foreign Application Priority Data

Jul. 1, 2004  (FR) ................... 04 07284

(51) Int. Cl.
*B60H 3/00*  (2006.01)

(52) U.S. Cl. ............... 96/222; 55/490; 55/491; 261/DIG. 88

(58) Field of Classification Search ............ 55/282, 55/490, 491, 502, 521; 96/222–227; 261/75, 261/101, DIG. 88
See application file for complete search history.

(56) References Cited

U.S. PATENT DOCUMENTS

| | | | | | |
|---|---|---|---|---|---|
| 3,902,877 | A | * | 9/1975 | Swaim | 55/490 |
| 3,992,892 | A | | 11/1976 | Sain et al. | |
| 4,028,073 | A | * | 6/1977 | Swaim | 96/222 |
| 4,065,262 | A | * | 12/1977 | Petroff | 96/222 |
| 4,118,226 | A | * | 10/1978 | Bourassa | 96/222 |
| 4,257,787 | A | * | 3/1981 | Taylor | 96/222 |

(Continued)

FOREIGN PATENT DOCUMENTS

FR  2 807 973 A  10/2001

(Continued)

*Primary Examiner*—Duane Smith
*Assistant Examiner*—Sonji Turner
(74) *Attorney, Agent, or Firm*—Howard & Howard Attorneys PLLC

(57) ABSTRACT

The purpose of the invention is a treatment device fitting in a filter, particularly a particle filter (1) or a combined filter of a heating, ventilation and/or air conditioning installation for a vehicle cabin, to prevent the development of microorganisms on the surfaces of such an installation. This device is composed mainly of a permeable container (6) for a volatile treatment agent, and comprises means for attachment of the container (6) to the filter (1) between the folds of the filter structure (3) making up the filter, so that the container (6) can be installed on any filter (1) in an existing installation to prevent the development of microorganisms on the surfaces of such an installation.

16 Claims, 2 Drawing Sheets

U.S. PATENT DOCUMENTS

| | | | | |
|---|---|---|---|---|
| 4,563,333 | A * | 1/1986 | Frigon | 422/122 |
| 4,604,114 | A * | 8/1986 | Ward | 96/222 |
| 4,875,912 | A * | 10/1989 | Fulmer | 96/222 |
| 4,959,087 | A * | 9/1990 | Kappernaros | 96/222 |
| 5,087,273 | A * | 2/1992 | Ward | 96/147 |
| 5,240,487 | A | 8/1993 | Kung | |
| 5,258,051 | A * | 11/1993 | Anderson | 96/222 |
| 5,368,822 | A * | 11/1994 | McNeil | 422/124 |
| 5,547,636 | A * | 8/1996 | Vick et al. | 422/124 |
| 6,117,218 | A * | 9/2000 | Snyder et al. | 96/222 |
| 6,746,521 | B2 * | 6/2004 | Canfield | 96/222 |
| 6,749,672 | B2 * | 6/2004 | Lynn | 96/222 |
| 7,243,788 | B2 * | 7/2007 | Schmidt et al. | 206/221 |
| 2002/0197187 | A1 * | 12/2002 | Murray | 422/124 |
| 2002/0197887 | A1 | 12/2002 | Chang | |
| 2003/0075047 | A1 * | 4/2003 | Bolduc | 95/284 |
| 2003/0097936 | A1 * | 5/2003 | Maleeny et al. | 95/285 |
| 2003/0205137 | A1 * | 11/2003 | Bolduc | 95/285 |
| 2004/0094037 | A1 * | 5/2004 | Maleeny et al. | 95/285 |
| 2004/0170537 | A1 * | 9/2004 | Hara | 422/122 |
| 2005/0103880 | A1 * | 5/2005 | Taite | 239/57 |
| 2005/0169813 | A1 * | 8/2005 | D'Amico et al. | 422/124 |
| 2006/0021302 | A1 * | 2/2006 | Bernard | 55/282 |
| 2006/0110297 | A1 * | 5/2006 | D'Amico et al. | 422/124 |
| 2006/0236869 | A1 * | 10/2006 | Giraud et al. | 96/222 |

FOREIGN PATENT DOCUMENTS

| | | | |
|---|---|---|---|
| JP | 2004 210084 A | | 12/2003 |
| WO | WO 02058812 | * | 8/2002 |
| WO | WO2004/096588 A | | 11/2004 |

* cited by examiner

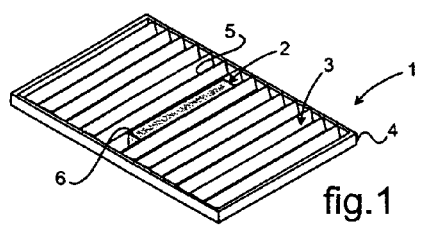
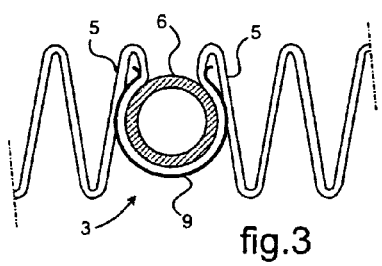
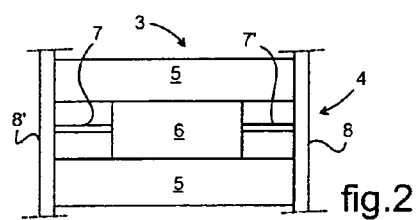
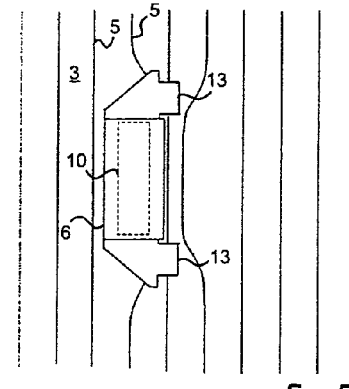
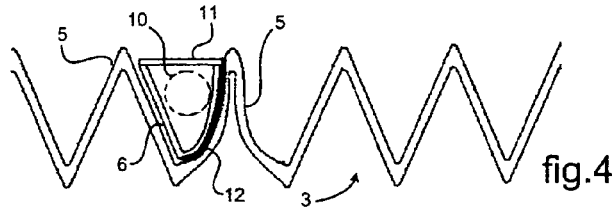

AIR TREATMENT DEVICE USED IN A PARTICLE FILTER OR A COMBINED FILTER FOR A HEATING, VENTILATION AND/OR AIR CONDITIONING INSTALLATION FOR A VEHICLE CABIN

TECHNICAL DOMAIN OF THE INVENTION

The domain of the invention is air treatment devices used in heating, ventilation and/or air conditioning installations for a vehicle cabin. It relates to a device making use of an agent for the treatment of surfaces that could foster the development of microorganisms such as surfaces of a filter and/or an evaporator included in such installations.

BACKGROUND

A general problem that arises in the field of heating, ventilation and/or air conditioning installations for the vehicle cabin relates to the surface treatment of the evaporator and filters such as a particle filter or combined filter that could foster the development of microorganisms. This installation generates odors that are transported by the airflow towards the vehicle cabin and that are disturbing to passengers. These odors are caused not only by phenomena involved in adsorption and desorption of gaseous pollutants, but also by the growth of the aforementioned microorganisms.

To prevent such a development of microorganisms, it is known that a specific treatment can be applied for the filter before the filter is placed inside the installation. It is known that deodorants or antiseptic sprays can be used to combat odors.

It is found that these installation treatments are not satisfactory with regard to long-term use and consequently need to be reapplied frequently. Furthermore, their efficiency is uncertain and variable for zones colonized by the microorganisms. In addition, routinely applied treatments are not preventive and, consequently, their application frequency is particularly indispensable.

It has also been proposed that a compartment should be added to the frame structure of the filter for reception of a device for the treatment of air by distribution of a treating agent. Disadvantages of such arrangements are due to its size, which must be restricted for a given available volume equal to the volume of the filter structure of the filter. Furthermore, for installation, the device requires a modification to the arrangement of the filter, thereby making it incapable of being adapted to any existing filter.

PURPOSE OF THE INVENTION

The purpose of this invention is to propose a device for the treatment of a heating, ventilation and/or air conditioning installation for a vehicle cabin to prevent the development of microorganisms.

In particular, this invention proposes such a device that is not too large, that does not hinder anything when the filter is put into place in the installation, that can be placed inside any existing installation by attaching it to the filter, and that is efficient in the long term, reliable and easily removable.

The device according to this invention is intended to be fitted on a filter of a heating, ventilation and/or air conditioning installation for a vehicle cabin to prevent the development of microorganisms.

At this stage of the description, it will be noted that, in particular, said filter comprises a folded filter structure also called the filter medium. In particular, this filter structure is supported by a frame structure generally arranged in a rectangular frame in the recess into which the filter structure extends. Note also that said filter can be a particle filter or a combined filter with a physicochemical treatment effect such as a filter associating active carbon with a mechanical particle filtration structure.

In general, the device according to this invention can be recognized in that it is composed mainly of a permeable container with a volatile treatment agent. The device also comprises means for attachment of the container to the filter between the folds of the filter structure of the container. These arrangements are such that the container can be installed on any filter in an existing installation, to prevent the development of microorganisms on the surfaces of such an installation.

Preferably, the container is arranged inside the filter structure, within its internal volume delimited by its overall size.

It will be noted that, in particular, the treatment agent has antibacterial and/or fungicidal properties. This treatment agent is also capable of having deodorizing properties to create a pleasant smell in the air of the vehicle cabin, either in isolation or in combination with the other properties that have just been mentioned.

According to a first alternative embodiment of the attachment means, they are composed of at least one device for attaching the container to the filter structure.

More particularly, said attachment device consists of a fastener to grip a fold of the filter structure, for example in the form of a staple. For example, this fastener may indifferently be a press-fitting-type, a clamp-type, a nesting device-type, and/or a perforating nail-type, or any other similar type of fastener.

According to a first embodiment, the container is provided with a so-called gripping device on at least one of its ends, and preferably at each of its ends, to keep it in place simply in the general plane of the filter structure.

According to a second embodiment, the fastener is a removable container attachment element that grips the container and at the same time at least one fold of the filter structure.

According to a third embodiment of the attachment means, they are of the type in which the container is glued onto the filter structure. For example, the container is equipped with adhesive paper on at least one of its sides to attach it to a fold of the filter structure, the adhesive side of the paper preferably being provided with an extemporaneously removable protection film.

According to a fourth alternative embodiment of the attachment means, they are composed of at least one device for holding the container on the filter frame structure, and more particularly to one side of the rectangular frame of the frame structure. It will be noted that the container is preferably attached to two opposite sides of this rectangular frame at each of its ends, to give a simple support of the container in the general plane of the filter structure.

This support device can advantageously be easily divided into a required length that can be extemporaneously adjusted to any sized filter frame structure, when the container is installed on the filter.

According to a preferred embodiment of the container, it is provided with an access door to its inside volume for replacement of the treatment agent contained in it. For example, this access door may be formed by an articulated wall of the container, providing access to the inside volume of the container when in the open position.

According to a first embodiment, the container preferably contains a support element for a treatment agent in the liquid state, and particularly a porous element. The treatment agent may be replenished by replacing the porous element previously impregnated with a treatment agent, or by adding a dose of the treatment agent onto the porous element located inside the container.

According to a second embodiment, the attachment means are of the easily reversible type, for example they may be composed of the aforementioned removable attachment element or other similar attachment means for replacement of the treatment agent by replacement of the container.

The container is preferably made of a microporous material to make it permeable. According to another alternative embodiment, the container is made permeable by making perforations through which the treatment agent is released.

DESCRIPTION OF THE FIGURES

This invention will be better understood after reading the description given below of example embodiments with reference to the appended figures in which:

FIG. 1 is a perspective illustration of an air treatment device in a heating, ventilation and/or air conditioning installation for the vehicle cabin, located in the folds of a filter structure of a particle filter.

FIGS. 2 to 5 are illustrations of example embodiments of attachment means for a device shown in FIG. 1, inside the volume delimited by the filter structure on which the device is located.

In FIG. 1, a particle filter 1, a combined filter or a similar filter for the treatment of air circulating through a heating, ventilation and/or air conditioning installation for the vehicle cabin, is fitted with a device 2 for the treatment of air passing through the filter 1, treatment of the filter structure 3 of the filter 1 to combat the development of microorganisms, and treatment of surfaces in an evaporator through which the airflow passes to combat the development of microorganisms. This filter 1 is composed mainly of a frame structure 4 approximately in the form of a rectangular frame, and a filter structure 3 or filter medium extends inside the recess in the rectangular frame. Note that this filter structure 3 is of the type comprising a plurality of folds 5 or similar arrangements and that this filter structure 3 delimits a generally planar volume not exceeding the volume delimited by the frame structure 4, to facilitate installation of the particle filter 1 in a drawer.

Figure 6:
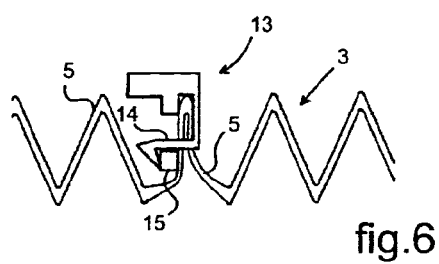
FIGS. 6 to 11 are diagrammatic illustrations of different alternative embodiments of attachment means of the type shown in FIG. 5.

The air treatment device 2 is composed mainly of a microporous container 6 containing a volatile treatment agent that is held in place between two successive folds 5 of the filter structure 3. Note that according to one advantage of this invention, this device 2 is contained in a general plane delimited by the filter structure 3 so as not to hinder installation of the filter 1. The filter agent is moved away when the ventilation, heating and/or air conditioning installation is not in operation.

In FIGS. 2 to 5, the container 6 is provided with attachment means on the particle filter, illustrated in different embodiments.

In FIG. 2, the container 6 is provided with a support device 7, 7' attaching it to the frame structure 4, and more particularly to two opposite sides 8, 8' of the frame structure. This support device 7, 7' is composed of a pair of attachment ribs formed on each end of the container 6. These attachment ribs 7, 7' can be broken to adjust their length to any size of an existing particle filter 1. It will be noted that according to one preferred embodiment of the invention, the container 6 is held in place by force-fitting between the sides 8, 8' of the rectangular frame 4 using attachment ribs 7, 7', so that it can be installed on any particle filter 1 already installed on a vehicle. However, and according to another embodiment, the size of the support device 7, 7' is adjusted to suit the size of any particle filter 1, on the frame structure 4 to which it is attached during manufacturing of the particle filter 1, by gluing, welding, or even insert molding or a similar attachment.

In FIG. 3, the container 6 is provided with one or several removable gripping fasteners 9 that jointly grip the container 6 and at least one fold 5 of the filter structure 3. This removable fastener 9 is composed in particular of a clip that grips a fold 5 of the filter structure 3 and a container 6 and holds them together, the container 6 preferably being cylindrical in section. This embodiment enables replacement of the treatment agent starting by easy replacement of the container 6. With continued reference to FIG. 3, the clip and the container 6 are disposed on opposite sides of the filter structure 3 without extending through the filter structure. The filter structure 3 is sandwiched between the clip and the container 6.

The container 6 in FIGS. 4 and 5 contains a support element 10 of the treatment agent in the liquid state. More particularly in FIG. 4, the container 6 comprises an access door 11 to its inside volume for replacement of the treatment agent. It will be noted that this access door 11 can advantageously be formed by an articulated wall of the container 6, with which it forms a single-piece assembly obtained by insert molding, particularly made of a plastic material and more particularly a microporous polypropylene.

Also in FIG. 4, the container 6 is attached by means of a gluing strip 12 to one of the folds 5 of the filter structure 3. This gluing 12 is done particularly by means of a double-sided adhesive film.

In FIG. 5, the container 6 is provided with an attachment fastener 13 at each of its ends fastening onto a fold 5 of the filter structure 3.

In FIGS. 6 to 9, the fastener 13 is of the type comprising a perforator passing through the fold 5 of the filter structure 3, and cooperating with a retaining device.

In FIG. 6, the perforator is in the form of a hook 14 cooperating with a retaining pin 15.

Figure 7:
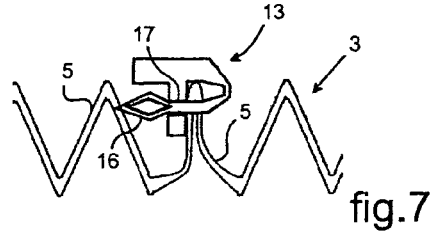

In FIG. 7, the perforator is in the form of a hook 16, the head of which is elastically deformable. The fastener 13 comprises an opening 17 through which the head of the deformed perforator 16 passes, which is then spontaneously held in place by returning to its initial conformation.

Figure 8:
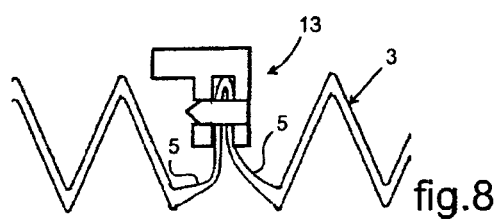

In FIG. 8, the perforator is composed of an independent pin 18 forming a key located inside a housing 19 in the fastener 13.

Figure 9:
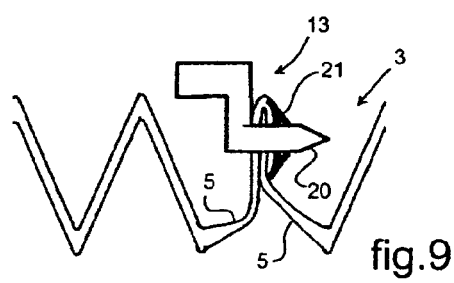

In FIG. 9, the perforator is an independent pin 20 that is retained using a clamping washer 21.

Figure 10:
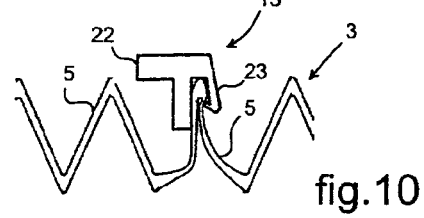
Figure 11:
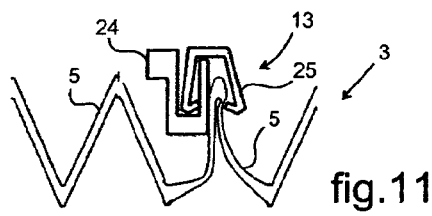

In FIGS. 10 and 11, the fastener 13 is arranged in the general form of a clamp. In FIG. 10, the clamp is composed of a single-piece device 22 comprising an elastic hook 23, while in FIG. 11, the fastener 13 is composed of a pair of elements 24 and 25 cooperating with each other to grip a fold 5 of the filter structure 3.

The invention claimed is:

1. Air treatment device, for a heating, ventilation and/or air conditioning installation for a vehicle cabin, comprising a filter structure (3) with folds (5), and a treatment device wherein the treatment device comprises a permeable container (6) with a volatile treatment agent, wherein the container (6) is held in place between two successive folds of the filter structure (3), and wherein the container (6) is equipped with at least one removable gripping fastener (9) that jointly grips the container (6) and at least one of the two successive folds (5) of the filter structure (3) for attaching the container (6) to the filter structure (3) between the folds of the filter structure (3), wherein the removable gripping fastener (9) is a clip and wherein the clip and the container (6) are disposed on opposite sides of the filter structure (3) with the filter structure (3) sandwiched between the clip and the container (6).

2. Air treatment device according to claim 1, wherein that the container is arranged inside the filter structure (3) within its internal volume delimited by its overall size.

3. Air treatment device according to claim 1, wherein the removable gripping fastener (9) is indifferently of a press fitting-type, a clamp-type, a nesting device-type, and/or a perforating nail-type.

4. Air treatment device according to claim 1, wherein the container (6) is glued (12) onto the filter structure (3).

5. Air treatment device according to claim 4, wherein the container (6) is fitted with a gluing strip 12 on at least one of its sides to attach it to a fold (5) of the filter structure (3).

6. Air treatment device according to claim 1, wherein the clip grips the at least one of the two successive folds (5) and the container (6) and holds them together.

7. Air treatment device according to claim 6, wherein the container (6) is cylindrical for fitting between the two successive folds (5).

8. Air treatment device according to claim 1, wherein the container (6) comprises an access door (11) leading to its internal volume for replacement of the volatile treatment agent.

9. A filter for a vehicle cabin heating, ventilation and/or air conditioning installation, wherein the filter comprises a filter structure (3) with folds and a treatment device having a permeable container (6) with a volatile treatment agent wherein the container (6) is held in place between two successive folds (5) of the filter structure (3), and wherein the container (6) is equipped with at least one removable gripping fastener (9) that jointly grips the container (6) and at least one of the two successive folds (5) of the filter structure (3) for attaching the container (6) to the filter structure (3) between the folds of the filter structure (3), wherein the removable gripping fastener (9) is a clip and wherein the clip and the container (6) are disposed on opposite sides of the filter structure (3) with the filter structure (3) sandwiched between the clip and the container (6).

10. A filter according to claim 9, wherein the container is arranged inside the filter structure (3) within its internal volume delimited by its overall size.

11. A filter according to claim 9, wherein the at least one removable gripping fastener (9) is selected from the group consisting of press fitting-type, clamp-type, nesting device-type, or perforating nail-type.

12. A filter, according to claim 9, wherein the container (6) comprises an access door (11) leading to its internal volume for replacement of the volatile treatment agent.

13. A filter, according to claim 12, wherein the container (6) is made of a microporous material to make it permeable.

14. A filter according to claim 9, wherein the clip grips the at least one of the two successive folds (5) and the container (6) and holds them together.

15. A filter according to claim 14, wherein the container (6) is cylindrical for fitting between the two successive folds (5).

16. Air treatment device, for a heating, ventilation and/or air conditioning installation for a vehicle cabin, comprising a filter structure (3) with folds (5), and a treatment device wherein the treatment device comprises a permeable container (6) with a volatile treatment agent, wherein the container (6) is held in place between two successive folds of the filter structure (3), and wherein the container (6) is equipped with at least one removable gripping fastener (9) that jointly grips the container (6) and at least one of the two successive folds (5) of the filter structure (3) for attaching the container (6) to the filter structure (3) between the folds of the filter structure (3), wherein the removable gripping fastener (9) is a clip and wherein the clip and the container (6) are disposed on opposite sides of the filter structure (3) without extending through the filter structure (3) with the filter structure (3) sandwiched between the clip and the container (6).

\* \* \* \* \*